Oct. 26, 1965  H. REHN  3,213,775
CAMERA WITH MOVABLE CLAW TYPE FILM FEED MECHANISM
Filed Feb. 8, 1963

United States Patent Office 3,213,775
Patented Oct. 26, 1965

3,213,775
CAMERA WITH MOVABLE CLAW TYPE FILM
FEED MECHANISM
Heinz Rehn, Braunschweig, Germany, assignor to Voigtlander A.G., Braunschweig, Germany, a corporation of Germany
Filed Feb. 8, 1963, Ser. No. 257,250
Claims priority, application Germany, July 11, 1962, V 14,223
1 Claim. (Cl. 95—31)

This invention relates to cameras wherein the film is advanced by a spring biased claw reciprocating parallel to the direction of film feed and pivoted or hinged to a tripping slide and, more particularly, to an improved film feed of this type wherein frictional resistance to claw movement is substantially eliminated.

In a known camera embodying this type of film feed mechanism, the feeding claw is biased to a position abutting a guide surface fixed relative to the camera, the claw having frictional engagement with this guide surface in at least one direction of movement thereof. In another form of camera embodying this type of film feed mechanism, a dual or double claw is so mounted that its portion between two claws teeth engages that portion of the film between these two claws. In this latter case, the pressure of the claw against the film proper increases the friction between the film and camera during feeding of the film.

The object of the present invention is to provide a camera having a film feed mechanism of the mentioned type in which the foregoing disadvantages are obviated.

In accordance with the invention, this object is attained by providing a claw type film feed mechanism in which the claw is spring biased to the feeding position wherein its tooth or teeth are engaged with the film perforations, but does not engage either the camera or the film except for projection of its teeth through the film perforations, the movement of the claw to engage its teeth in the film perforations being limited by a stop on the tripping slide. In the invention arrangement, while the tooth or teeth of the claw are engaged with the film perforations, the other parts of the claw do not engage either the film or any fixed portions of the camera. Thus, during movement of the tripping slide, there is no friction between the claw and the camera and, in feeding the film, the claw does not bear on the film other than to have its tooth or teeth engaged in the film perforations.

In a preferred embodiment of the invention, the stop on the tripping slide also serves as an anchor for the claw biasing spring. Advantageously, the tripping slide is made of round and preferably circular cross-section stock, so that it is possible to mount the slide in a simple manner through bores in portions of the camera housing with the claw being oscillatable, or hinged, about the axis of the tripping slide.

For an understanding of the principles of the invention, reference is made to the following description of a typical embodiment thereof as illustrated in the accompanying drawings. In the drawings.

Figure 1:
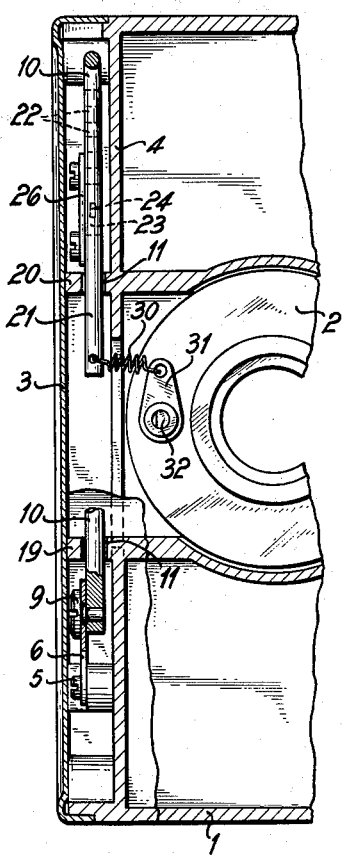
FIG. 1 is a partial sectional view of a camera embodying the invention, taken on the line I—I of FIG. 2.

Referring to the drawings, a camera embodying the invention is illustrated as having a casing or housing 1 within which is a shutter 2 of the type mounted between objective lenses. The bottom of housing 1 is closed by a plate 3 which extends in each direction beyond the film feed, and also beyond the shutter cocking or charging mechanism mounted on a partition 4. The shutter cocking mechanism is illustrated as actuated by a control lever 6 pivotally mounted on a support in housing for oscillation about a screw or other type of pivot 5. A tension spring 7 engaged between a portion of the housing and lever 6, biases lever 6 to the rest position illustrated in FIG. 2 in solid lines. The other terminal position of lever 6 is illustrated in broken lines in FIG. 2.

Control lever 6 is formed with an aperture 8, and a screw 9 extends through this aperture and is engaged in a tripping slide 10. In accordance with the invention, tripping slide 10 is preferably made of round stock and is slidably mounted in corresponding bores 11 in partitions or arms 19 and 20 of the housing or casing 1.

A film feeding claw 12 is mounted on slide 10 and has teeth engageable in the perforations of a film 13. Claw 12 is oscillatable about the axis of slide 10, and is biased in one direction by a torsion spring 14 coiled on slide 10 and having one end 15 connected to claw 12 and the other end secured to a pin 16 secured in slide 10. Pin 16 also serves as a stop for a tang or abutment 17 bent from claw 12 at an angle, and spring 14 tends to maintain abutment 17 engaged with pin 16. In this position, the teeth of claw 12 project into the perforations of film 13, as best seen in FIGS. 2 and 3, while the remainder of claw 12 remains out of contact with both the camera housing and the film.

Claw 12 is restrained against axial or longitudinal movement along slide 10 by means of a pair of spring clips 18 engaged in circumferential grooves in slide 10. Movement of slide 10 in either direction is limited by engagement of one or the other of the clips 18 with the parts 19 or 20 of the housing.

Figure 2:
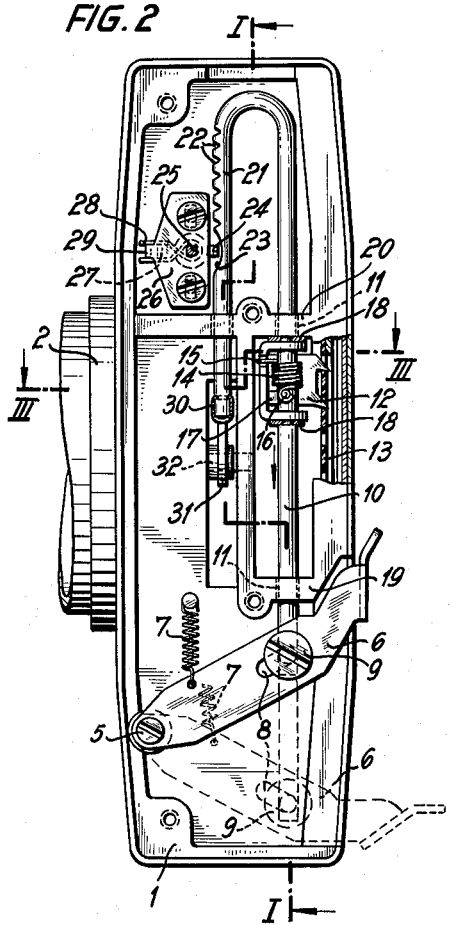
FIG. 2 is a bottom plan view of the camera with the bottom cover plate removed.
Figure 3:
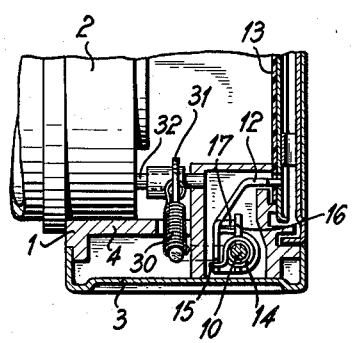
FIG. 3 is a partial vertical sectional view of the camera taken on the line III—III of FIG. 2.

When control lever 6 is swung from its solid line position to its dotted line position, as illustrated in FIG. 2, slide 10 and claw 12 are advanced in the direction of the arrow to entrain film 13 and advance it in the direction of the arrow. Upon return movement of lever 6 under the bias of spring 7, with resultant reverse motion of slide 10, the teeth of claw 12 are disengaged from the film perforations due to the fact that these teeth are beveled downwardly and outwardly as viewed in FIG. 2. Thus, the teeth do not affect any movement of the film until they are engaged in other perforations as illustrated in FIG. 2.

A known type of reversal inhibitor means is provided to operate upon tripping slide 10 so that the direction of travel of the slide can be reversed only at the limits of its stroke. Referring to FIGS. 1 and 2, a rack 22 is formed along the outer surface of a U-shaped reentrant portion 21 of slide 10, the length of the rack corresponding to the extent of the feed movement of film 13. At one end of rack 22, there is a recess 23 in the outer surface of the part 21, and a corresponding recess effect is attained at the other end of rack 22 by virtue of the bight connecting part 21 to the main part of slide 10.

A plate 26 is mounted adjacent rack 22 on part 21, and a locking lever 24 is pivoted about a pin or bolt 25 on plate 26. An angular projection 27 on lever 24 extends between the arms of a spring 28 which is coiled about pin 25 in such a manner that both arms tend to engage a lug 29 on plate 26, this lug being disposed between the spring ends. By this arrangement, the locking lever is biased to the position shown in FIG. 2.

When slide 10 is operated, locking lever 24 swings about its bearing 25 in one or the other direction due to engagement with the teeth of rack 22. As a consequence, extension 27 moves one or the other arms of spring 28 away from the lug 29. Spring 28 again biases locking lever 24 to its central position as soon as locking lever 24 is opposite either recess 23 or the bight joining 21 to the main part of slide 10.

As best seen in FIG. 1, a tension spring 30 has one end secured to part 21 of slide 10 and its other end connected to a contact arm 31 fixed on the shutter cocking lever shaft 32 of shutter 2. When slide 10 is moved in a film advancing direction, shutter 2 is simultaneously cocked by means of spring 30.

The formation of slide 10 of round stock has the advantage, in addition to that of easy mounting in simple bores of the housing, that this type of mounting assures satisfactory light sealing in the area wherein claw 12 operates.

While a specific embodiment of the invention has been shown and described in detail to illustrate the application of the principles of the invention, it will be understood that the invention may be embodied otherwise without departing from such principles.

What is claimed is:

In a photographic camera of the type which has a camera housing in which film feeding is effected by a claw pivotally mounted on a slide which is reciprocable parallel to the direction of film feed, the claw having a tooth biased to engage the film perforations during movement in a film advancing direction and disengaging the film perforations during movement in a reverse direction, the film in the region of its engagement by the claw tooth extending sufficiently closely to the housing so that the tooth extending through a perforation would engage the housing unless restrained from so doing; the improvement in that said slide includes a rod portion of circular cross section reciprocal in the direction of its length, said claw including claw mounting means having bearing means circularly apertured and turnably receiving said rod portion therethrough, said tooth thereby engaging and disengaging said perforations by corresponding turning movements of said bearing means about the axis of said rod portion, a stop pin mounted upon said rod portion and extending transversely therefrom towards said claw, a torsion spring around said rod portion, one end of said spring connected to said pin, the other end of said spring connected to said claw, said spring biasing said claw to pivot in a film engaging direction, and an abutment fixed to said claw and positioned and adapted to strike the end of said pin proximate to said claw and thereby to limit the movement of said tooth through said perforations under the spring bias and thereby to prevent said tooth from engaging said housing portion.

References Cited by the Examiner

UNITED STATES PATENTS

| | | | |
|---|---|---|---|
| 1,355,096 | 10/20 | Mingel | 226—68 |
| 2,166,440 | 7/39 | Jones. | |
| 2,168,043 | 8/31 | O'Grady | 226—68 |
| 2,560,159 | 7/51 | Coutant et al. | 226—68 |
| 2,854,906 | 10/58 | Lachmann | 95—31 |
| 2,860,559 | 11/58 | Maiershofer | 95—31 |

EVON C. BLUNK, *Primary Examiner.*